US009246843B2

United States Patent
Yang et al.

(10) Patent No.: US 9,246,843 B2
(45) Date of Patent: Jan. 26, 2016

(54) DETECTING AND RECOVERING FROM A TRANSMISSION CHANNEL CHANGE DURING A STREAMING MEDIA SESSION

(71) Applicant: Apple Inc., Cupertino, CA (US)

(72) Inventors: Yan Yang, San Jose, CA (US); Sundararaman V. Shiva, Los Gatos, CA (US); Roberto Garcia, Sunnyvale, CA (US); Joe S. Abuan, San Jose, CA (US); Hyeonkuk Jeong, Saratoga, CA (US); James O. Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 14/018,348

(22) Filed: Sep. 4, 2013

(65) Prior Publication Data

US 2014/0068084 A1     Mar. 6, 2014

Related U.S. Application Data

(60) Provisional application No. 61/696,792, filed on Sep. 4, 2012.

(51) Int. Cl.
*H04L 12/923* (2013.01)
*H04W 36/00* (2009.01)
*H04L 12/859* (2013.01)
*H04L 12/875* (2013.01)
*H04L 12/823* (2013.01)
*H04L 12/801* (2013.01)
*H04L 29/06* (2006.01)

(52) U.S. Cl.
CPC .......... *H04L 47/762* (2013.01); *H04L 47/2475* (2013.01); *H04L 47/32* (2013.01); *H04L 47/34* (2013.01); *H04L 47/564* (2013.01); *H04L 69/00* (2013.01); *H04W 36/00* (2013.01)

(58) Field of Classification Search
CPC ......... H04L 41/00; H04L 43/00; H04L 51/00; H04L 61/00; H04L 65/00; H04L 67/00; H04L 69/00; H04L 47/762
See application file for complete search history.

(56) References Cited

U.S. PATENT DOCUMENTS

| | | | |
|---|---|---|---|
| 8,018,955 B2 | 9/2011 | Agarwal et al. | |
| 2002/0150048 A1* | 10/2002 | Ha | H04L 1/1887 370/231 |
| 2009/0147741 A1* | 6/2009 | Hu | H04W 72/085 370/329 |

(Continued)

FOREIGN PATENT DOCUMENTS

| | | |
|---|---|---|
| WO | 2008/113693 | 9/2008 |
| WO | 2012/148330 | 11/2012 |
| WO | 2013/119159 | 8/2013 |

*Primary Examiner* — Wing F Chan
*Assistant Examiner* — Billy H Ng
(74) *Attorney, Agent, or Firm* — Downey Brand LLP

(57) ABSTRACT

A method for detecting and recovering from a transmission channel change during a streaming media session is disclosed. The method can include a wireless communication device detecting a stall condition resulting from a transmission channel change. The method can further include the wireless communication device capturing a snapshot of a current transmission parameter state of the streaming media session in response to detecting the stall condition. The method can also include the wireless communication device using the snapshot to restore the streaming media session to the transmission parameter state captured by the snapshot following completion of the transmission channel change.

20 Claims, 9 Drawing Sheets

(56) References Cited

U.S. PATENT DOCUMENTS

2010/0128649 A1    5/2010    Gonsa et al.
2012/0243523 A1*    9/2012    Liu ........................ H04L 1/0002
                                                                                                                                                       370/338

\* cited by examiner

DETECTING AND RECOVERING FROM A TRANSMISSION CHANNEL CHANGE DURING A STREAMING MEDIA SESSION

CROSS-REFERENCE TO RELATED APPLICATIONS

This application claims priority to U.S. Provisional Patent Application No. 61/696,792, filed on Sep. 4, 2012, which is incorporated herein in its entirety by reference.

FIELD OF THE DESCRIBED EMBODIMENTS

The described embodiments relate generally to wireless communications and more particularly to detecting and recovering from a transmission channel change during a streaming media session.

BACKGROUND

Media streaming applications that stream media from a wireless communication device over a wireless network can suffer from stall conditions in which media packets become stalled in a baseband queue and cannot be transmitted from the wireless communication device. As a result of a stall condition, rate control mechanisms can quickly ramp down a rate at which media packets are generated and/or transmitted. After recovery from the stall condition, a slow ramp up period can occur in which media packet transmission rate can slowly recover to the pre-stall condition. The stall and slow ramp up period can accordingly negatively impact user experience.

In some instances, a stall condition can result from degradation of a network channel condition, such as a wireless channel by which the wireless communication device can be connected to a cellular base station or other wireless network access point. In such instances, it can be appropriate to enter a slow ramp up period following recovery from the stall condition. In this regard, slow ramp up can be used to avoid flooding a potentially bad network connection with a larger volume of packets than the network connection is capable of handling.

However, in some instances, a stall condition can be caused by an event other than degradation of a network channel condition. For example, in some instances, a stall condition can be caused by a device changing transmission channels. In this regard, some wireless communication devices have multiple transmission channels and can switch transmission channels during an active streaming media session in order to use a channel with better conditions. In instances in which a transmission channel change is performed, a network channel condition may not have degraded. As such, using standard rate control mechanisms that implement a slow ramp up period following a stall condition resulting from a transmission channel change can unnecessarily degrade user experience for an extended period following the stall condition.

BRIEF SUMMARY OF SOME DISCLOSED EMBODIMENTS

Some embodiments disclosed herein provide for detecting and recovering from a transmission channel change during a streaming media session. More particularly, a wireless communication device in accordance with some example embodiments can be configured to detect a stall condition resulting from a transmission channel change and can capture snapshot of a current transmission parameter state of a streaming media session in response to detecting the stall condition. After completion of a transmission channel change, the wireless communication device of some such example embodiments can use the captured snapshot to restore the streaming media session to the transmission parameter state captured by the snapshot. Accordingly, such example embodiments provide for detection and recovery from a transmission channel change such that a streaming media session can quickly recover from a transmission channel change without experiencing a slow ramp up following the transmission channel change. User experience can accordingly be improved, as a transmission rate of the streaming media session can more quickly return to the pre-stall transmission rate following the stall condition.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Figure 1:
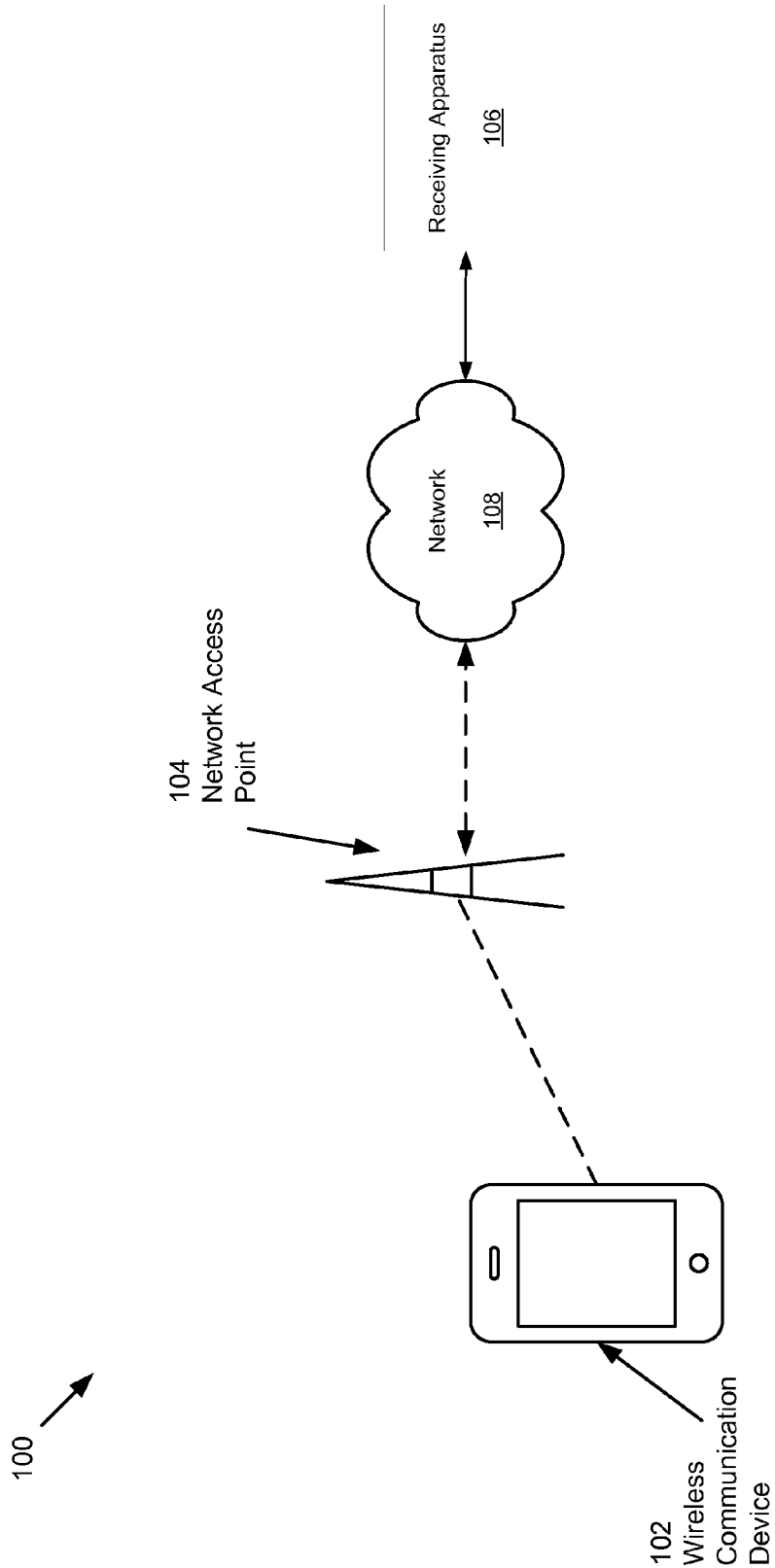
FIG. 1 illustrates a wireless communication system including a wireless communication device in accordance with some example embodiments.

Prior wireless communication devices perform a slow ramp up period following a stall condition in a streaming media session regardless of the cause of the stall condition. Accordingly, prior devices often perform a slow ramp up period even in scenarios in which a stall condition is caused by an event other than degradation of a network channel condition, thus negatively impacting user experience. For example, some stall conditions can result from a wireless communication device switching transmission channels during a streaming media session. In this regard, change of transmission channels can occur under the control of a hardware, or baseband, layer in the wireless communication device and an application layer in prior devices generally does not have any advance knowledge of the change in transmission channels. Accordingly, rate control mechanisms performed at the application layer by prior devices during a transmission channel change implement a slow ramp up of the transmission rate from a post-stall state following the transmission channel change even if the network channel conditions remain the same as prior to the stall, thus negatively impacting user experience.

Some example embodiments disclosed herein improve user experience during streaming media sessions compared to prior devices by providing for detecting and recovering from a transmission channel change for a media streaming application in a wireless network. More particularly, a wireless communication device in accordance with some example embodiments can be configured to detect a stall condition resulting from a transmission channel change and can capture snapshot of a current transmission parameter state of a streaming media session in response to detecting the stall condition. After completion of a transmission channel change, the wireless communication device of some such example embodiments can use the captured snapshot to restore the streaming media session to the transmission parameter state captured by the snapshot.

In some example embodiments, detection of the stall condition can be performed at an application layer. An application layer in accordance with some such example embodiments can wait for up to a defined period of time following detection of the stall condition for an indication from the baseband layer that a transmission channel change has occurred. If a transmission channel change has occurred, the application layer of such example embodiments can use the captured snapshot to restore the transmission parameter state of the streaming media session to the state that existed when the stall condition occurred. However, if the stall condition did not result from a transmission channel change, the application layer of such example embodiments can discard the snapshot and can implement a slow ramp up period of a data transmission rate of the streaming media session to recover from the stall condition.

Accordingly, example embodiments disclosed herein provide for detection and recovery from a transmission channel change such that a streaming media session can quickly recover from a transmission channel change without experiencing a slow ramp up following the transmission channel change. User experience can accordingly be improved, as a transmission rate of the streaming media session can return to the pre-stall transmission rate more quickly following the stall condition.

FIG. 1 illustrates a wireless communication system 100 including a wireless communication device 102 in accordance with some example embodiments. The wireless communication device 102 can, for example, be a cellular phone, such as a smart phone device, a tablet computing device, a laptop computing device, or other computing device that can be configured to wirelessly access a network and operate within the wireless communication system 100.

The wireless communication device 102 can be configured to wirelessly access a network, such as the network 108, via one or more network access points 104. A network access point 104 can, for example, be a cellular base station, such as, by way of non-limiting example, a base transceiver station (BTS), a node B, an evolved node B (eNB), femtocell, or other type of cellular base station. As a further example, a network access point 104 can be embodied as a wireless local area network (WLAN) access point, such as a wireless router, wireless bridge, and/or other type of access point that can be used to access a WLAN. In some embodiments, wireless communication system 100 can include a plurality of network access points 104, which can be of a variety of types (e.g., a mixture of multiple types of cellular base stations, a mixture of one or more types of cellular base stations and one or more WLAN access points, or the like). It will be appreciated, however, that the foregoing example embodiments of the network access point 104 are non-limiting, and that the embodiment of the wireless network access point 104 can vary depending on a type of radio access technology (RAT) used for communication between the wireless communication device 102 and network access point 104.

The wireless communication device 102 can be configured to use any present or future developed RAT to wirelessly access a network, such as network 108, via a wireless network access point, such as wireless network access point 104. For example, in some embodiments, such as in some embodiments in which wireless network access point 104 is embodied as a cellular base station, the wireless communication device 102 can be configured to use a cellular RAT to access a network. For example, in some embodiments, the wireless communication device 102 can be configured to use a fourth generation (4G) cellular RAT, such as a Long Term Evolution (LTE) RAT, including LTE, LTE-Advanced (LTE-A), and/or the like to access a network. As another example, in some embodiments, the wireless communication device 102 can be configured to use a third generation (3G) RAT, such as a Universal Mobile Telecommunications System (UMTS) RAT, such as Wideband Code Division Multiple Access (WCDMA) or Time Division Synchronous Code Division Multiple Access (TD-SCDMA); a CDMA2000 RAT (e.g., 1xRTT) or other RAT standardized by the Third Generation Partnership Project 2 (3GPP2); and/or other 3G RAT to access a network. As a further example, in some embodiments, the wireless communication device 102 can be configured to use a second generation (2G) RAT, such as a Global System for Mobile Communications (GSM) RAT, and/or other 2G RAT to access a network. It will be appreciated, however, that the foregoing examples of cellular RATs are provided by way of example, and not by way of limitation. In this regard, other present or future developed cellular RATs, including various fifth generation (5G) RATs now in development, can be used by the wireless communication device 102 to access a network within the scope of the disclosure.

In some example embodiments, the wireless communication device 102 can additionally or alternatively be configured to access a network via a non-cellular RAT. For example, in some embodiments, such as some embodiments in which wireless network access point 104 is embodied as a WLAN access point, a WLAN RAT, such as an Institute of Electrical and Electronics Engineers (IEEE) standardized Wi-Fi RAT (e.g., IEEE 802.11 a/b/g/n/ac/ad/etc.), can be used by the wireless communication device 102 to access a network.

The wireless communication device 102 can be configured to communicate with one or more remote devices via a wireless network connection. For example, in some embodiments, the wireless communication device 102 can be configured to communicate with the receiving apparatus 106 via the network 108. The network 108 can be any network that can be accessed via network access point 104 and that can support communication between two or more devices, such as the wireless communication device 102 and the receiving apparatus 106. By way of non-limiting example, network 108 can include can include one or more wireless networks (e.g., one or more cellular networks, one or more WLANs, and/or the like), one or more wireline networks, or some combination thereof, and, in some example embodiments, can include the Internet The receiving apparatus 106 can be any computing device that can receive media data that can be streamed by the wireless communication device 102. In some example embodiments, the receiving apparatus 106 can be a second wireless communication device 102.

In some example embodiments, the wireless communication device 102 can be configured to engage in a streaming media session and stream media data, such as audio data, video data, a combination of audio and video data, and/or other data that can be streamed over a network, such as the network 108, to one or more remote devices, such as the receiving apparatus 106. For example, the wireless communication device 102 of some example embodiments can have a media streaming application implemented thereon, which can be configured to transmit media data, such as media packets, for a streaming media session to the receiving apparatus 106 over the network 108 via a wireless communication link to network access point 104. The media streaming application can be any application that can stream media data, such as audio, video, or some combination thereof to one or more receiving devices. By way of non-limiting example, the media streaming application can be a video call and/or video conferencing application, such as Apple® Inc.'s FaceTime®. Media data that can be streamed by the wireless communication device 102 during a streaming media session can, for example, include real time media and/or non-real time media.

In some example embodiments, a streaming media session can include streaming of data in a single direction, such as from wireless communication device 102 to the receiving apparatus 106 during a streaming media session. However, in some example embodiments, a streaming media session can include multi-directional data streaming in which media data can be streamed from the wireless communication device 102 to one or more receiving apparatuses 106 and from one or more receiving apparatuses 106 to the wireless communication device 102. For example, multi-directional data streaming can be used in some example embodiments to support real time video calls, conference calls, and/or the like.

Figure 2:
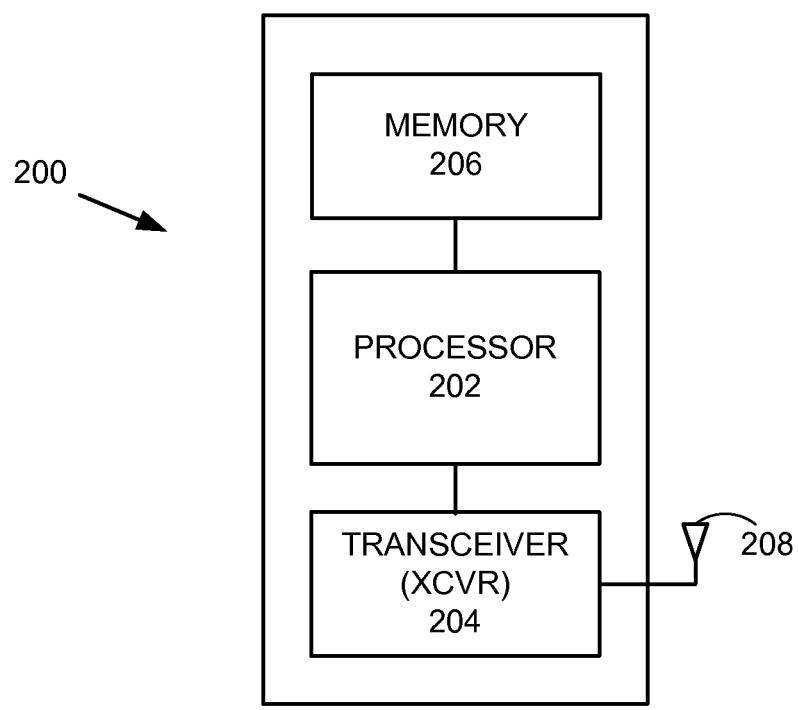
FIG. 2 illustrates a block diagram of an example apparatus that can be implemented on a wireless communication device in accordance with some example embodiments.

FIG. 2 illustrates a block diagram of an example apparatus 200 that can be implemented on a wireless communication device, such as wireless communication device 102, in accordance with some example embodiments. The apparatus 200 can include a processor 202 coupled with memory 206 and also coupled with a wireless transceiver(s) 204. Processor 202 can be configured to read, write and execute processor instructions stored in memory 206. Processor 202 can also be configured to control wireless transceiver(s) 204. The wireless transceiver 204 can be configured to use one or more antennas 208 to support wireless communication with one or more wireless devices and/or networks. For example, in some embodiments, wireless transceiver 204 can connect to wireless networks, such as via a wireless network access point 104 and/or other wireless network access point. Accordingly, in some such example embodiments, the wireless transceiver 204 can be configured to enable transmission of media packets and/or other media data that can be streamed in a streaming media session to a receiving apparatus 106 over a wireless channel (e.g., a wireless channel between the wireless communication device 102 and network access point 104).

Figure 3:
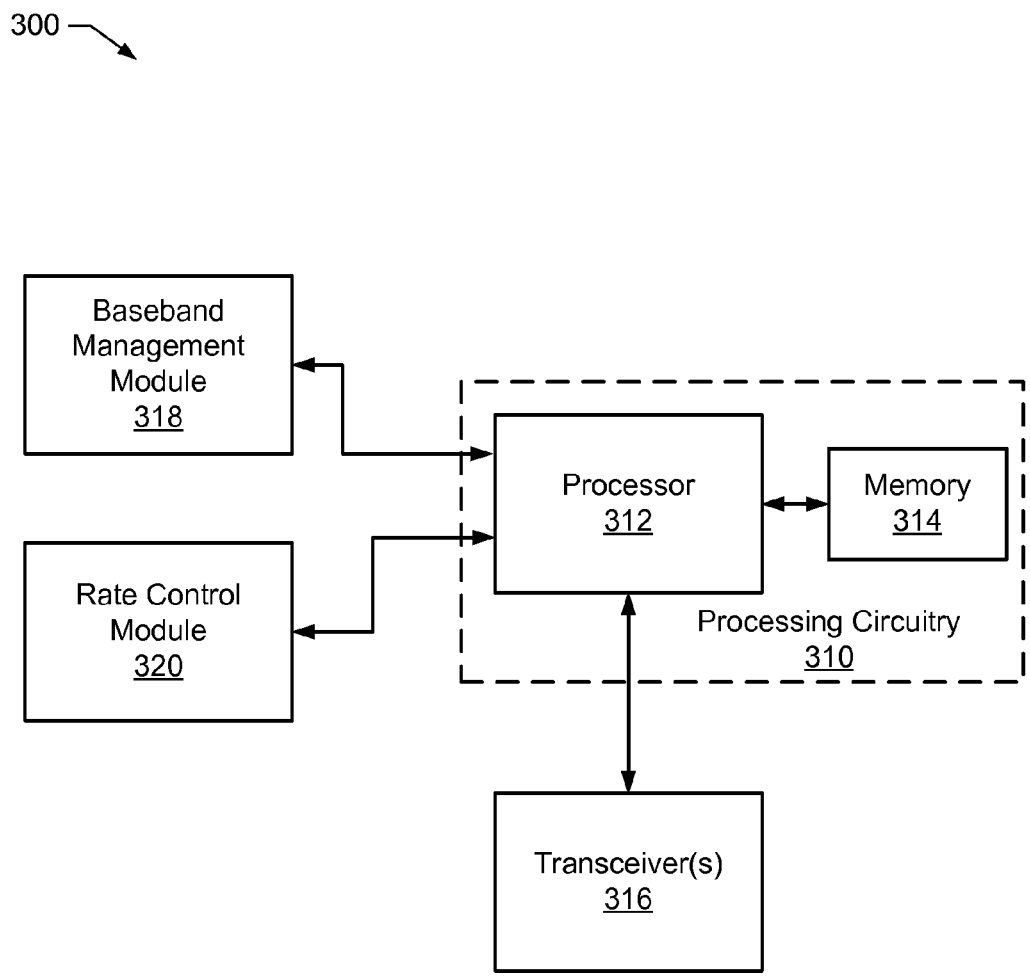
FIG. 3 illustrates a block diagram of another example apparatus that can be implemented on a wireless communication device in accordance with some example embodiments.

FIG. 3 illustrates a block diagram of another example apparatus that can be implemented on a wireless communication device, such as wireless communication device 102, in accordance with some embodiments. In this regard, FIG. 3 illustrates an apparatus 300 that can, when implemented on a computing device, such as wireless communication device 102, enable the computing device to operate within the system 100 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of a wireless communication device in accordance with various example embodiments, and thus can provide means for performing functionalities of wireless communication device 102 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 100 when implemented on or otherwise operably coupled to the computing device. For example, in some embodiments, one or more components of the apparatus 300 can provide baseband circuitry that can be configured to enable a computing device, such as wireless communication device 102, to access and communicate over a wireless network using one or more RATs In some example embodiments, the processing circuitry 310 can include a processor 312 and, in some embodiments, such as that illustrated in FIG. 3, can further include memory 314. The processor 312 can, for example, be an embodiment of the processor 202. The memory 314 can, for example, be an embodiment of the memory 206. As such, in some example embodiments, the processing circuitry 310 can be at least partially embodied by the processor 202 and/or memory 206. The processing circuitry 310 can be in communication with, control, and/or otherwise be coupled with a transceiver(s) 316, baseband management module 318, and/or rate control module 320.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of a communication device as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver(s) 316, baseband management module 318, or rate control module 320 via a bus (or buses) for passing information among components of the apparatus 300.

The apparatus 300 can further include one or more transceivers 316. The transceiver(s) 316 can, for example, be an embodiment of the transceiver 204. The transceiver 316 can be configured to enable the apparatus 300 to send (e.g., transmit) wireless signals to and receive wireless signals from a wireless network via a connection to a wireless network access point, such as the wireless network access point 104. As such, the transceiver(s) 316 can be configured to support any type of RAT that may be used to support communication over a wireless channel between a wireless communication device and a network. Thus, for example, the transceiver(s) 316 can be configured to support communication via any type of RAT that can be used for communication between the wireless communication device 102 and a wireless network access point 104.

The apparatus 300 can further include a baseband management module 318. The baseband management module 318 can be embodied as various means, such as circuitry, hardware, a computer program product comprising a computer readable medium (for example, the memory 314) storing computer readable program instructions that are executable by a processing device (for example, the processor 312), or some combination thereof. The baseband management module 318 can be configured to manage operations that can be performed at a baseband layer of a wireless communication device, such as wireless communication device 102. For example, the baseband management module 318 of some example embodiments can be configured to manage a baseband queue, such as the baseband queue 608 illustrated in and described further herein below with respect to FIG. 6, in which media data for transmission in a streaming media session can be queued prior to transmission. In some such embodiments, the baseband module 318 can be configured to provide queue status information for the baseband queue to an application layer, such as the application layer 602 illustrated in and described further herein below with respect to FIG. 6, that can be responsible for generating media data for transmission in a streaming media session and for implementing rate control mechanisms for controlling a transmission rate of a streaming media session. In some example embodiments, the baseband management module 318 can be configured to control selection and switching between multiple transmission channels that can be available for use by a wireless communication device.

The apparatus 300 can further include rate control module 320. The rate control module 320 can be embodied as various means, such as circuitry, hardware, a computer program product comprising a computer readable medium (for example, the memory 314) storing computer readable program instructions that are executable by a processing device (for example, the processor 312), or some combination thereof. The rate control module 320 can be configured to control application layer functionality, such as transmission rate control mechanisms, for managing a streaming media session.

The rate control module 320 of some example embodiments can be configured to detect occurrence of a stall condition resulting from a transmission channel change in a streaming media session and can capture a snapshot of the transmission parameter state of the streaming media session in response to detecting the stall condition. The rate control module 320 of some such example embodiments can be configured to use the snapshot to restore the streaming media session to the transmission parameter state captured by the snapshot following completion of the transmission channel change. In some example embodiments, the baseband management module 318 and the rate control module 320 can be configured to communicate with each other to support detection of a stall condition and implementation of transmission rate control mechanisms in accordance with various example embodiments described further herein below.

The wireless communication device 102 can include a plurality of transmission channels. The multiple transmission channels can, for example, include multiple antennas or other transmission channels that can be dispersed at various positions in the wireless communication device 102. As another example, two or more transmission channels that can be implemented on the wireless communication device 102 in accordance with some example embodiments can each correspond to a respective RAT. For example, a first transmission channel can be used for WLAN access and a second transmission channel can be used for cellular network access.

The wireless communication device 102 of some example embodiments can switch between transmission channels while media is being streamed by the wireless communication device 102. For example, in some embodiments, the wireless communication device 102 can be configured to switch between transmission channels during a streaming media session based on observed channel conditions, device usage context, and/or other information that can be used to select an appropriate transmission channel. In this regard, the wireless communication device 102 can switch to use a transmission channel that can offer better conditions (e.g., latency, loss rate, interference, throughput, and/or other conditions) than a current transmission channel. A transmission channel change can generally occur when conditions on a current transmission channel regress to be worse than conditions on a candidate transmission channel. For example, a transmission channel change can be made responsive to a change in network channel conditions, effects on channel conditions that can be caused by a user's hand position on the device, and/or other factors. A change in transmission channel can be controlled in some example embodiments by a hardware layer (e.g., a baseband layer) that can be implemented on the wireless communication device 102. For example, in some embodiments, the baseband management module 318 can be configured to selectively switch transmission channels during a streaming media session.

Figure 4:
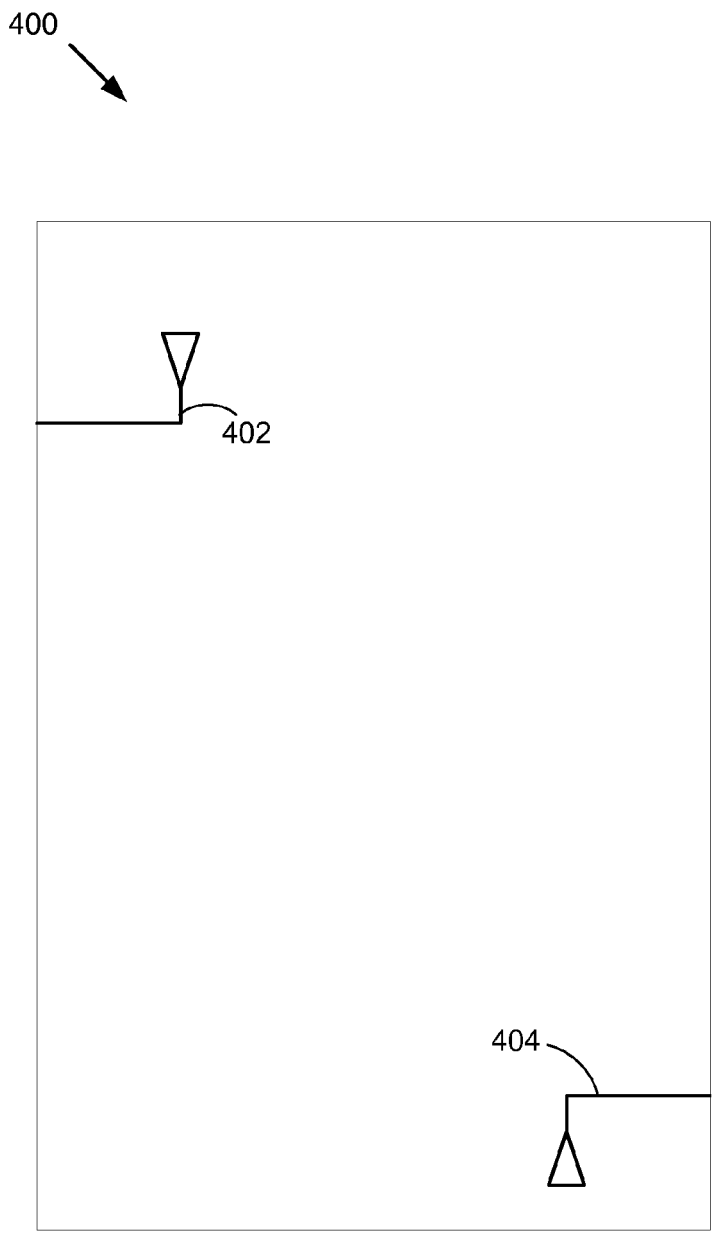
FIG. 4 illustrates an example transmission channel change in accordance with some example embodiments.

FIG. 4 illustrates an example transmission channel change in accordance with some example embodiments. FIG. 4 illustrates an example wireless communication device 400 having multiple antennas, including the antenna 402 and antenna 404. The wireless communication device 400 can, for example, be an embodiment of the wireless communication device 102. As illustrated in FIG. 4, the antennas 402 and 404 can be disposed in opposing corners of the wireless communication device 400. The wireless communication device 400 can initially use the antenna 402 to support a streaming media session. However, during the streaming media session, contextual conditions of the wireless communication device 400 can change such that the antenna 404 can provide a better transmission channel than the antenna 402. For example, a user can change an orientation of the wireless communication device 400 such that the antenna 404 is better positioned to communicate with a wireless network access point without interference compared to the antenna 402. As another example, a user can change a hand position with which he or she may be holding or otherwise manipulating the wireless communication device 400 such that the antenna 402 can be obstructed by the user's new hand position and/or the antenna 404 can be exposed from prior obstruction by the user's prior hand position.

Figure 5:
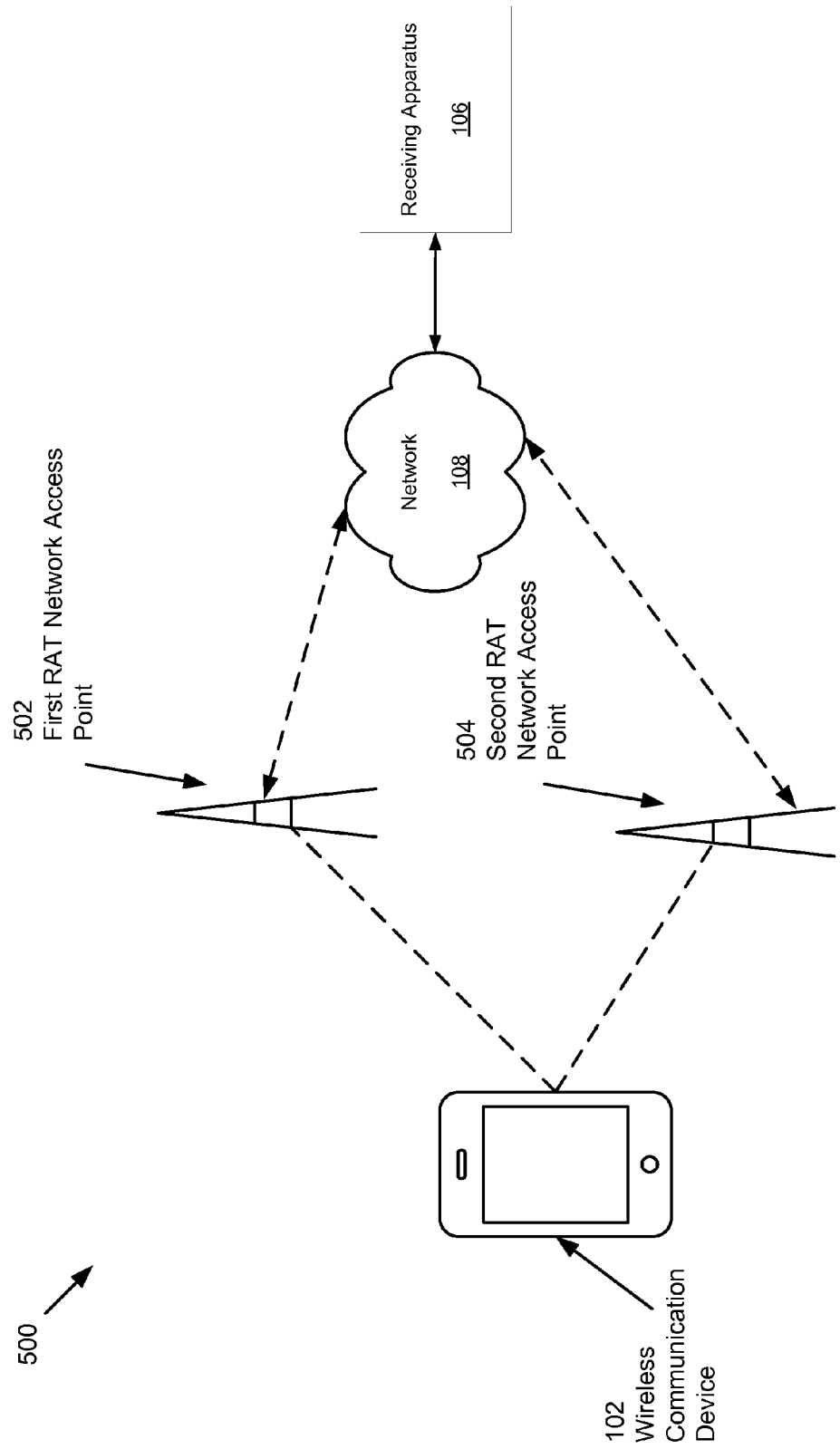
FIG. 5 illustrates another example transmission channel change in accordance with some example embodiments.

FIG. 5 illustrates another example transmission channel change in accordance with some example embodiments. More particularly, FIG. 5 illustrates a transmission channel change that can be performed within an example wireless communication system 500 including a network access point 502 using a first RAT and a network access point 504 using a second RAT. In this regard, FIG. 5 illustrates an example embodiment of the system 100 in which the wireless communication device 102 can be configured to access a network, such as the network 108, via multiple RATs and the system includes a plurality of network access points 104 (e.g., the network access point 502 and the network access point 504), which collectively provide network access via multiple types of RATs. For example, in some embodiments, one of the network access point 502 and the network access point 504 can be configured to provide network access via a WLAN RAT and the other of the network access point 502 and the network access point 504 can be configured to provide network access via a cellular RAT.

The wireless communication device 102 can, for example, stream media data for a streaming media session to the receiving apparatus 106 via a transmission channel to the network access point 502 using a first RAT. While engaged in the streaming media session, conditions can change such that a second transmission channel via a connection to the network access point 504 using a second RAT can provide better conditions than and/or can otherwise be preferred to the transmission channel to the network access point 502 using the first RAT. The wireless communication device 102 can accordingly be configured to switch transmission channels during the streaming media session to a connection to the network access point 504 via the second RAT in response to the changed conditions. As such, the wireless communication device 102 of some example embodiments can accordingly change transmission channels during a streaming media session by switching from a network access point using a first RAT, such as the network access point 502, to a network access point using a second RAT, such as the network access point 504.

It will be appreciated that the example transmission channel changes illustrated in and described with respect to FIG. 4 and FIG. 5 are provided by way of example, and not by way of limitation. In this regard, other types of transmission channel changes in addition to or in lieu of a change in antenna and a change in type of RAT used to support a streaming media session contemplated within the scope of the disclosure. It will be further appreciated that techniques for recovering from a transmission channel change that are described herein with respect to a change in antennas and/or a change in a type of RAT used can be applied mutatis mutandis to other types of transmission channel changes within the scope of the disclosure.

Figure 6:
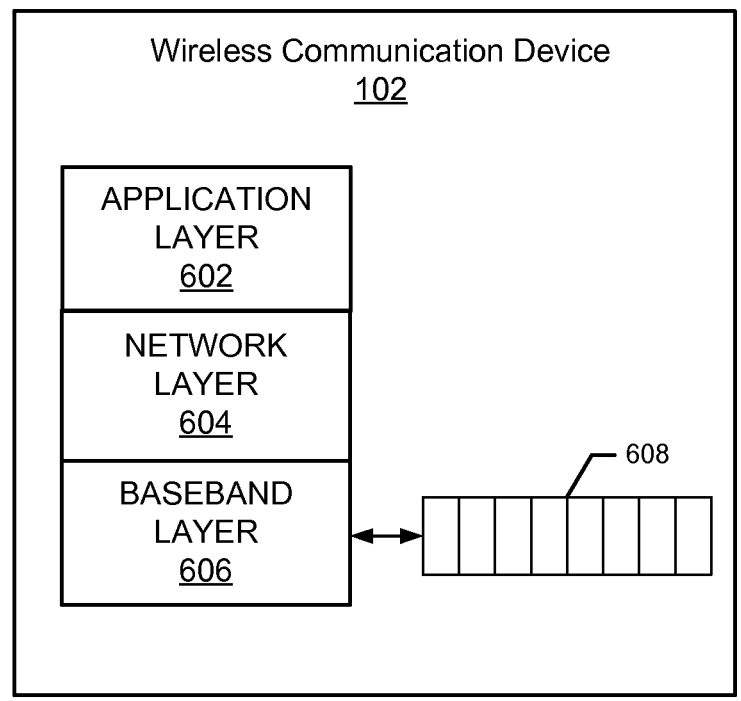
FIG. 6 illustrates a block diagram of system layers that can operate in a wireless communication device in support of a streaming media session in accordance with some example embodiments.

FIG. 6 illustrates a block diagram of system layers that can operate in a wireless communication device in support of a streaming media session in accordance with some example embodiments. These layers can include an application layer 602 and a baseband layer 606. The layers can additionally include one or more intermediate system layers, such as network layer 604, which can be disposed between the application layer 602 and the baseband layer 606 within the system layer hierarchy. Application layer 602 can correspond to a media streaming application. For example, in embodiments in which the wireless communication device has a media streaming application, such as FaceTime® or other video conferencing application supporting a video call between two or more devices (e.g., wireless communication device 102 and one or more receiving apparatuses 106), implemented thereon, the application layer 602 can correspond to the video conferencing application.

The application layer 602 and baseband layer 606 can be configured to communicate with each other. In this regard, for example, the application layer 602 and baseband layer 606 can communicate by passing data to each other via one or more intermediate layers, such as network layer 604. Additionally or alternatively, in some example embodiments, application layer 602 can send data to the baseband layer 606 and/or baseband layer 606 can send data to the application layer 602 via a communication path that can bypass network layer 604 and/or one or more further intermediate system layers that can be disposed between the application layer 602 and the baseband layer 606.

In some embodiments, application layer 602 can generate media packets and/or other media data units for streaming in a streaming media session. The generated media data can, for example, include audio packets, video packets, and/or packets containing both audio and video data. The application layer 602 can pass the media data to the baseband layer 606, which can control transmission of the media packets over the wireless channel. Media packets received by the baseband layer 606 from the application layer 602 can be at least temporarily stored in the baseband queue 608 prior to transmission from the wireless communication device 102. The baseband layer 606 can provide feedback to the application layer 602, which can include status information for the baseband queue 608. The queue status information can, for example, include an indication of how many bytes are in the queue, how many media packets are in the queue, how many bytes have been sent, how many packets have been sent, what packets are in the queue, what packets have been sent, and/or other information.

The application layer 602 can be configured to calculate a transmission rate for the streaming media session based on queue status information that can be provided by the baseband layer 606. Further, the application layer 602 can determine an occurrence of a stall condition based on a calculated transmission rate and/or otherwise on the basis of queue status information that can be received from the baseband layer 606. A stall condition can, for example, be a stall in transmission of media packets from the baseband queue 608 for some period of time. As another example, a stall condition can be an imbalance condition in which the application layer 602 can be generating media packets at a faster rate than they are being transmitted by the baseband layer 606.

In response to detecting a stall condition, the application layer 602 can be configured to capture a snapshot of a current transmission parameter state of the streaming media session. The snapshot can, for example, include current transmission channel parameters, such as transmission rate, type of media packets used, and/or other parameters that can be reflective of a transmission state and/or otherwise used for rate control purposes.

The application layer 602 can be further configured, if not already known, whether the stall condition resulted from a transmission channel change. In some example embodiments, the application layer 602 can be configured to determine whether the stall condition resulted from a transmission channel change based at least in part on baseband layer feedback that can be provided by the baseband layer 606. For example, in some embodiments, the application layer 602 can wait for a defined period of time following detection of the stall condition for an indication from the baseband layer 606 that a transmission channel change has occurred. In waiting for the defined period of time, the application layer 602 can, for example, set a timer having a period corresponding to the defined period of time and wait for up to expiry of the timer.

The defined period of time can be any period of time sufficient to allow the baseband layer 606 sufficient time to react to a stall condition, make a transmission channel change, and inform the application layer 602 of the transmission channel change. For example, in some embodiments, it can take the baseband layer 606 on the order of 900 milliseconds to make a transmission channel change. In such embodiments, the application layer 602 can wait for a period of time sufficient to accommodate detection of a stall condition by the baseband layer 606, the 900 milliseconds to make a transmission channel change, and sufficient time for the baseband layer 606 to inform the application layer 602 of the transmission channel change. By way of example, and not by way of limitation, in some example embodiments, the application layer 602 can wait for approximately 3 seconds following detection of a stall condition to receive an indication from the baseband layer 606 that a transmission channel change has occurred.

In an instance in which the application layer 602 receives an indication from the baseband layer 606 that a transmission channel change within the defined period of time, the application layer 602 can trigger a fast recovery. In this regard, the application layer 602 can use the captured snapshot to restore the transmission parameter state to the state captured in the snapshot at the time of the stall. Accordingly, transmission rate can return to substantially the same rate as was occurring at the time of the stall rather than entering a slow ramp up period following a post-stall channel state in which the transmission rate can be substantially reduced from the rate at the time of the stall. The media application can accordingly quickly recover from the stall without ongoing impact on user experience that might otherwise result from a slow ramp up following the stall.

If, however, the application layer 602 does not receive an indication from the baseband layer 606 that a transmission channel change has occurred within the defined period of time, the application layer 602 can assume that the stall condition resulted from a cause other than a transmission channel change, such as from poor network channel conditions. In such instances, the application layer 602 can discard the captured snapshot rather than restoring the transmission parameter state to the state captured by the snapshot at the time of the stall. As such, the transmission channel can enter a slow ramp up recovery and adapt to network channel conditions following the stall.

In some example embodiments, one or more media packets in the baseband queue 608 can be flushed in response to a stall condition and/or in response to a transmission channel change. Flushing of the baseband queue 608 can be performed by the baseband layer 606 based on logic that can be implemented in the baseband layer 606 and/or in response to a command from the application layer 602. For example, in some embodiments, all packets having a time stamp that is older than a defined threshold time can be flushed from the baseband queue 608. As another example, in some embodiments, the oldest packets can be flushed from the baseband queue 608 until no more than a threshold maximum number of packets remains in the baseband queue 608.

By flushing older packets from the baseband queue 608, the wireless communication device 102 can avoid sending old, outdated packets that may have been in the baseband queue 608 when the stall condition occurred when the transmission channel recovers (e.g., subsequent to completion of a transmission channel change) and packets can again be transmitted. In this regard, sending the old packets after the transmission channel change can result in a poor user experience and needless processing of outdated packets at the recipient apparatus 606. Further, the recipient apparatus 606 can use the time stamp in received packets to calculate a round trip time (RTT) for the streaming media session. If the recipient apparatus 606 uses a time stamp in an outdated packet to calculate RTT, the calculated RTT can be longer than the actual RTT on the channel, which can trigger implementation of rate reduction mechanisms that would degrade user experience even though actual channel conditions might not necessitate such a rate reduction.

In some example embodiments, at least some functionality of the application layer 602 as described above can, for example, be performed under control of the rate control module 320. Further, in some example embodiments, at least some functionality of the baseband layer 606 as described above can, for example, be performed under control of the baseband management module 318.

Figure 7:
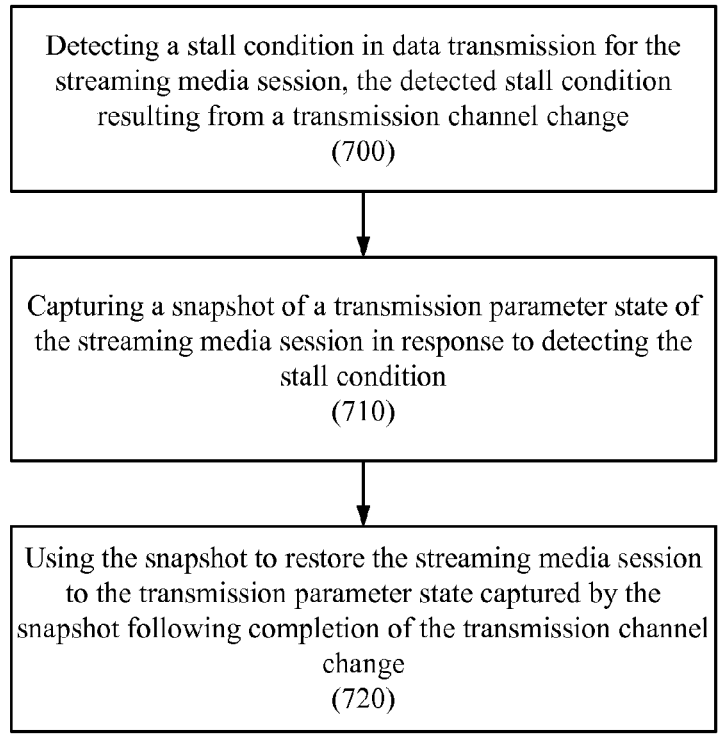
FIG. 7 illustrates a flowchart according to an example method for detecting and recovering from a transmission channel change during a streaming media session in accordance with some example embodiments.

FIG. 7 illustrates a flowchart according to an example method for detecting and recovering from a transmission channel change during a streaming media session in accordance with some example embodiments. In this regard, FIG. 7 illustrates operations that can be performed by a wireless communication device, such as wireless communication device 102, participating in a streaming media session in accordance with some example embodiments. One or more of processor 202, transceiver 204, memory 206, processing circuitry 310, processor 312, memory 314, transceiver(s) 316, baseband management module 318, or rate control module 320 can, for example, provide means for performing one or more of the operations illustrated in and described with respect to FIG. 7.

Operation 700 can include the wireless communication device 102 detecting a stall condition in data transmission for the streaming media session. The detected stall condition can have resulted from a transmission channel change. In some example embodiments, operation 700 can be performed at an application layer, such as application layer 602. For example, in some embodiments, the stall condition can be detected at the application layer based on queue status information that can be provided to the application layer by a baseband layer, such as baseband layer 606, for a baseband queue, such as baseband queue 608, in which media data for the streaming media session can be queued prior to transmission. The stall condition can, for example, be detected based on a transmission rate that can be calculated based on the queue status information. The detected stall condition can, for example, be a total stall in transmission of media packets from the baseband queue (e.g., for some period of time). As another example, the detected stall condition can be an imbalance condition in which the application layer can be generating media packets at a faster rate than they are being transmitted by the baseband layer.

Operation 710 can include the wireless communication device 102 capturing a snapshot of a transmission parameter state of the streaming media session in response to detecting the stall condition. The transmission parameter state can, for example, include a transmission rate for the streaming media session, a type of media packets being used for the streaming media session, and/or other parameters that can be reflective of a transmission state and/or otherwise used for rate control purposes for the streaming media session. In some example embodiments, operation 710 can be performed at an application layer, such as application layer 602.

Operation 720 can include the wireless communication device 102 using the snapshot to restore the streaming media session to the transmission parameter state captured by the snapshot following completion of the transmission channel change. In some example embodiments, operation 720 can be performed at an application layer, such as application layer 602.

Figure 8:
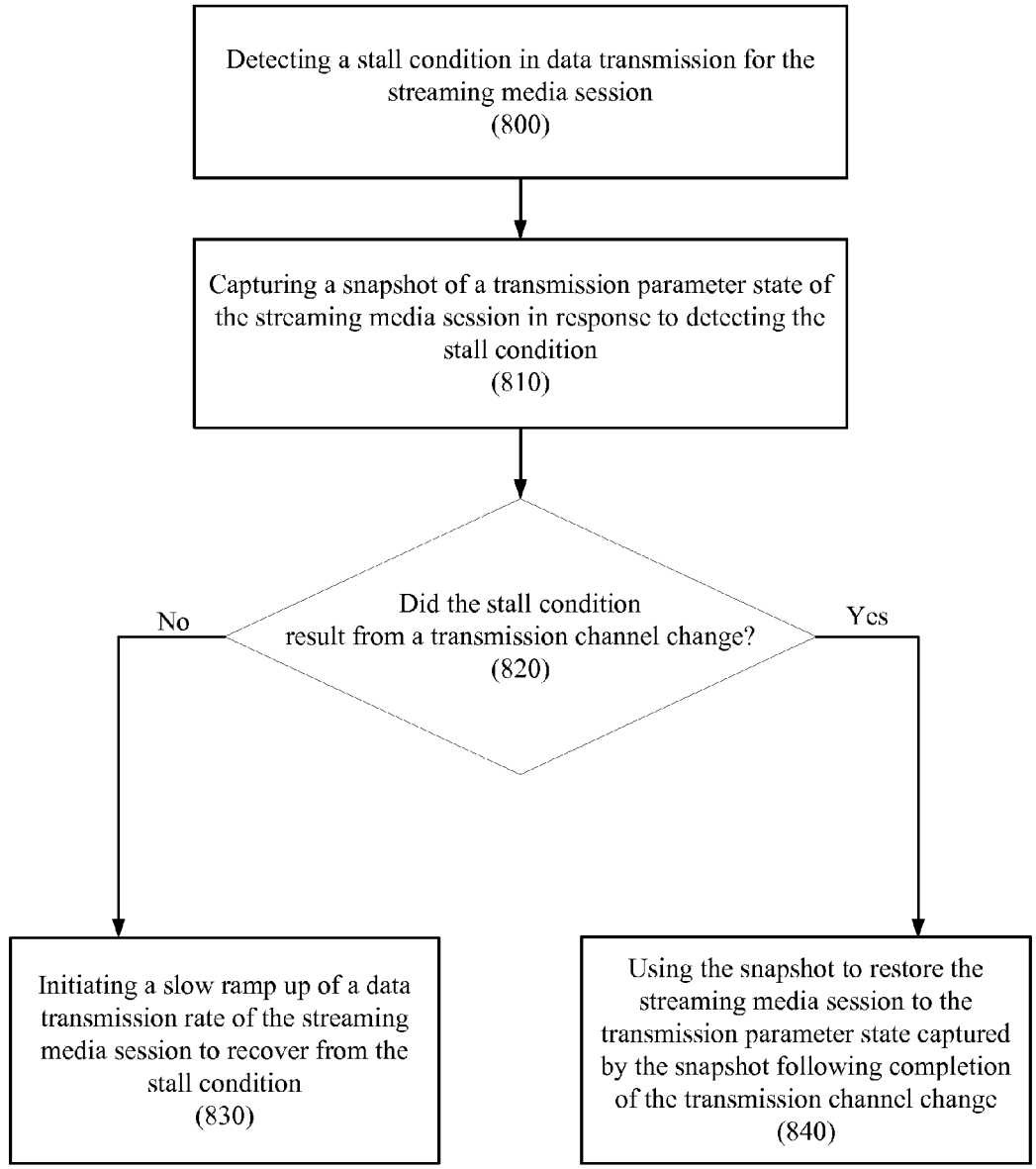
FIG. 8 illustrates a flowchart according to another example method for detecting and recovering from a transmission channel change during a streaming media session in accordance with some example embodiments.

FIG. 8 illustrates a flowchart according to another example method for detecting and recovering from a transmission channel change during a streaming media session in accordance with some example embodiments. In this regard, FIG. 8 illustrates operations that can be performed by a wireless communication device, such as wireless communication device 102, participating in a streaming media session in accordance with some example embodiments. One or more of processor 202, transceiver 204, memory 206, processing circuitry 310, processor 312, memory 314, transceiver(s) 316, baseband management module 318, or rate control module 320 can, for example, provide means for performing one or more of the operations illustrated in and described with respect to FIG. 8.

Operation 800 can include the wireless communication device 102 detecting a stall condition in data transmission for the streaming media session. In this regard, operation 800 can, for example, correspond to an embodiment of operation 700. In some example embodiments, operation 800 can be performed at an application layer, such as application layer 602. For example, in some embodiments, the stall condition can be detected at the application layer based on queue status information that can be provided to the application layer by a baseband layer, such as baseband layer 606, for a baseband queue, such as baseband queue 608, in which media data for the streaming media session can be queued prior to transmission. The stall condition can, for example, be detected based on a transmission rate that can be calculated based on the queue status information. The detected stall condition can, for example, be a total stall in transmission of media packets from the baseband queue (e.g., for some period of time). As another example, the detected stall condition can be an imbalance condition in which the application layer can be generating media packets at a faster rate than they are being transmitted by the baseband layer.

Operation 810 can include the wireless communication device 102 capturing a snapshot of a transmission parameter state of the streaming media session in response to detecting the stall condition. The transmission parameter state can, for example, include a transmission rate for the streaming media session, a type of media packets being used for the streaming media session, and/or other parameters that can be reflective of a transmission state and/or otherwise used for rate control purposes for the streaming media session. In some example embodiments, operation 810 can be performed at an application layer, such as application layer 602. Operation 810 can, for example, correspond to an embodiment of operation 710.

Operation 820 can include the wireless communication device 102 determining whether the stall condition resulted from a transmission channel change. In some example embodiments, operation 820 can be performed based at least in part on baseband layer feedback that can be provided by a baseband layer, such as baseband layer 606. For example, in some embodiments, the baseband layer can be configured to provide an indication to the application layer that a transmission channel change has occurred. In some example embodiments, such as the embodiment illustrated in and described below with respect to FIG. 9, the wireless communication device 102 (e.g., the application layer of the wireless communication device 102) can be configured to wait for a defined period of time following detection of the stall condition for an indication from the baseband layer that a transmission channel change has occurred. If an indication that a transmission channel change has occurred is provided by the baseband layer within the defined period of time, the wireless communication device 102 (e.g., the application layer of the wireless communication device 102) can determine that the stall condition resulted from a transmission channel change. If, however, an indication that a transmission channel change has occurred is not provided by the baseband layer within the defined period of time, the wireless communication device 102 (e.g., the application layer of the wireless communication device 102) can determine that the stall condition did not result from a transmission channel change.

In an instance in which it is determined at operation 820 that the stall condition did not result from a transmission channel change, the method can proceed to operation 830, which can include the wireless communication device 102 initiating a slow ramp up of a data transmission rate of the streaming media session to recover from the stall condition.

If, however, it is determined at operation 820 that the stall condition did result from a transmission channel change, the method can instead proceed to operation 840. Operation 840 can include the wireless communication device 102 using the snapshot to restore the streaming media session to the transmission parameter state captured by the snapshot following completion of the transmission channel change. In some example embodiments, operation 840 can be performed at an application layer, such as application layer 602. Operation 840 can, for example, be an embodiment of operation 720.

Figure 9:
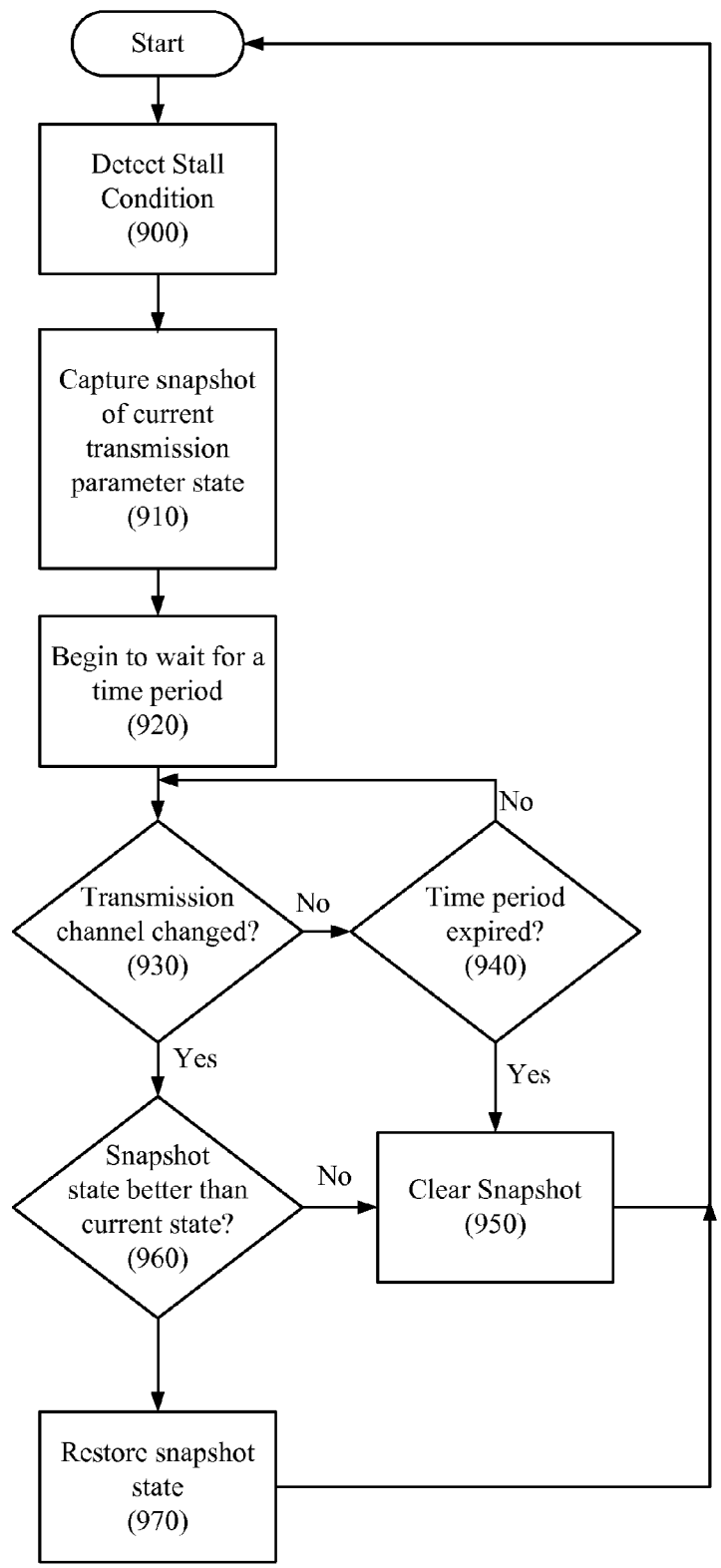
FIG. 9 illustrates a flowchart according to a further example method for detecting and recovering from a transmission channel change during a streaming media session in accordance with some example embodiments.

FIG. 9 illustrates a flowchart according to a further example method for detecting and recovering from a transmission channel change during a streaming media session in accordance with some example embodiments. In this regard, FIG. 9 illustrates operations that can be performed by a wireless communication device, such as wireless communication device 102, participating in a streaming media session in accordance with some example embodiments. One or more of processor 202, transceiver 204, memory 206, processing circuitry 310, processor 312, memory 314, transceiver(s) 316, baseband management module 318, or rate control module 320 can, for example, provide means for performing one or more of the operations illustrated in and described with respect to FIG. 9.

Operation 900 can include the application layer 602 detecting a stall condition. The stall condition can be a stall in transmission of packets from the baseband queue 608. The detected stall condition can, for example, be a total stall in transmission of media packets from the baseband queue 608 (e.g., for some period of time). As another example, the detected stall condition can be an imbalance condition in which the application layer 602 can be generating media packets at a faster rate than they are being transmitted from the baseband queue 608 by the baseband layer 606. Detection of the stall condition can, for example, be based on feedback including queue status information for the baseband queue 608 that can be provided by the baseband layer 606 and received at the application layer 602. Operation 900 can, for example, correspond to an embodiment of operation 700 and/or operation 800.

Operation 910 can include the application layer 602 capturing a snapshot of parameters of the current transmission parameter state for the streaming media session. The transmission parameter state can, for example, include a transmission rate for the streaming media session, a type of media packets being used for the streaming media session, and/or other parameters that can be reflective of a transmission state and/or otherwise used for rate control purposes for the streaming media session. Operation 910 can, for example, correspond to an embodiment of operation 710 and/or operation 810.

At operation 920, the application layer 602 can begin to wait for a defined period of time. Operation 930 can include determining whether the transmission channel has been changed. For example, operation 930 can include determining whether an indication that a transmission channel change has occurred has been received at the application layer 602 from the baseband layer 606. In an instance in which it is determined at operation 930 that a transmission channel change has not yet occurred (e.g., that an indication that a transmission channel has occurred has not yet been provided by the baseband layer 606), the method can proceed to operation 940. Operation 940 can include determining whether the defined period of time has expired. If it is determined at operation 940 that the defined period of time has not expired, the method can return to operation 930. If, however, the defined period of time has expired, it may be determined that the stall condition is due to a cause other than a transmission channel switch, and the method can proceed to operation 950. Operation 950 can include clearing (e.g., discarding) the snapshot. The transmission channel can then be allowed to recover from the post-stall state in accordance with slow ramp up to adapt to channel conditions. Operations 920-940 can accordingly correspond to an embodiment of operation 820.

In an instance in which it is determined at operation 930 that a transmission channel has occurred, the method can proceed to operation 960. Operation 960 can include determining whether the snapshot state (e.g., the state captured in operation 910) is better than a current transmission parameter state (e.g., a transmission parameter state as it exists following the stall condition and completion of the transmission channel change).

If it is determined at operation 960 that the snapshot state is not better than the current state, the method can proceed to operation 950, and the snapshot can be cleared or otherwise discarded. The current transmission parameter state can accordingly continue to be used without restoring the snapshot state in instances in which the snapshot state is not better than the current state.

If, however, it is determined at operation 960 that the snapshot state is better than the current state, the method can proceed to operation 970, which can include restoring the snapshot state. Operation 970 can correspond to an embodiment of operation 720 and/or operation 840.

In some example embodiments, operation 960 can be omitted. In such embodiments, if it is determined at operation 930 that a transmission channel change has occurred, the method can proceed directly to operation 970.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for recovering from a transmission channel change during a streaming media session over a wireless network, the method comprising a wireless communication device:
   detecting a stall condition in data transmission for the streaming media session;
   capturing a snapshot of a transmission parameter state of the streaming media session in response to detecting the stall condition;
   determining whether the stall condition resulted from a transmission channel change;
   in an instance in which it is determined that the stall condition resulted from a transmission channel change, using the snapshot to restore the streaming media session to the transmission parameter state captured by the snapshot following completion of the transmission channel change; and
   in an instance in which it is determined that the stall condition did not result from a transmission channel change, initiating a slow ramp up of a data transmission rate of the streaming media session to recover from the stall condition.

2. The method of claim 1, wherein determining whether the stall condition resulted from a transmission channel change comprises determining based at least in part on baseband layer feedback whether the stall condition resulted from a transmission channel change.

3. The method of claim 2, wherein determining based at least in part on baseband layer feedback whether the stall condition resulted from a transmission channel change comprises:
   waiting for up to a defined period of time for an indication from the baseband layer that a transmission channel change has occurred;
   determining that the stall condition resulted from a transmission channel change in an instance in which an indication that a transmission channel change has occurred is provided by the baseband layer within the defined period of time; and
   determining that the stall condition did not result from a transmission channel change in an instance in which an indication that a transmission channel change has occurred is not provided by the baseband layer within the defined period of time.

4. The method of claim 1, wherein detecting the stall condition and capturing the snapshot are performed at an application layer.

5. The method of claim 1, further comprising discarding the snapshot in an instance in which it is determined that the stall condition did not result from a transmission channel change.

6. The method of claim 1, further comprising, in an instance in which it is determined that the stall condition resulted from a transmission channel change, flushing one or more media packets in a baseband queue in which media packets for the streaming media session are queued prior to transmission by the wireless communication device.

7. The method of claim 1, further comprising the wireless communication device, in an instance in which it is determined that the stall condition resulted from a transmission channel change:
   determining whether the transmission parameter state captured by the snapshot is better than a current transmission parameter state existing following completion of the transmission channel change; and
   using the snapshot to restore the streaming media session only in an instance in which it is determined that the transmission parameter state captured by the snapshot is better than the current transmission parameter state.

8. The method of claim 1, wherein capturing the snapshot of the transmission parameter state comprises capturing a transmission rate for the streaming media session.

9. The method of claim 1, wherein detecting the stall condition comprises detecting the stall condition based at least in part on a status of a baseband queue in which media data for the streaming media session is queued prior to transmission by the wireless communication device.

10. The method of claim 9, wherein detecting the stall condition comprises:
    calculating a transmission rate for the streaming media session based at least in part on the status of the baseband queue; and
    detecting the stall condition based at least in part on the calculated transmission rate.

11. The method of claim 9, wherein detecting the stall condition based at least in part on the status of the baseband queue comprises an application layer detecting the stall condition based at least in part on queue status information for the baseband queue provided to the application layer by a baseband layer.

12. A wireless communication device comprising:
    at least one transceiver configured to transmit data and receive data for a streaming media session over a wireless network; and
    processing circuitry coupled with the at least one transceiver, the processing circuitry configured to control the wireless communication device to at least:
      detect a stall condition in data transmission for the streaming media session, the detected stall condition resulting from a transmission channel change;
      capture a snapshot of a transmission parameter state of the streaming media session in response to detecting the stall condition; and
      use the snapshot to restore the streaming media session to the transmission parameter state captured by the snapshot following completion of the transmission channel change.

13. The wireless communication device of claim 12, wherein the processing circuitry is further configured to control the wireless communication device to:
    determine whether the stall condition resulted from a transmission channel change;
    use the snapshot to restore the streaming media session to the transmission parameter state captured by the snapshot only in an instance in which it is determined that the stall condition resulted from a transmission channel change; and
    in an instance in which it is determined that the stall condition did not result from a transmission channel change, initiate a slow ramp up of a data transmission rate of the streaming media session to recover from the stall condition.

14. The wireless communication device of claim 13, wherein the processing circuitry is further configured to control the wireless communication device to determine whether the stall condition resulted from a transmission channel change at least in part by controlling the wireless communication device to:

wait for up to a defined period of time for an indication from a baseband layer that a transmission channel change has occurred;

determine that the stall condition resulted from a transmission channel change in an instance in which an indication that a transmission channel change has occurred is provided by the baseband layer within the defined period of time; and determine that the stall condition did not result from a transmission channel change in an instance in which an indication that a transmission channel change has occurred is not provided by the baseband layer within the defined period of time.

15. The wireless communication device of claim 12, wherein the processing circuitry is further configured to control the wireless communication device to detect the stall condition and capture the snapshot at an application layer.

16. The wireless communication device of claim 12, wherein the processing circuitry is further configured to control the wireless communication device to:

determine whether the transmission parameter state captured by the snapshot is better than a current transmission parameter state existing following completion of the transmission channel change; and use the snapshot to restore the streaming media session only in an instance in which it is determined that the transmission parameter state captured by the snapshot is better than the current transmission parameter state.

17. The wireless communication device of claim 12, wherein the processing circuitry is further configured to control the wireless communication device to detect the stall condition at least in part by controlling the wireless communication device to detect the stall condition based at least in part on a status of a baseband queue in which media data for the streaming media session is queued prior to transmission by the wireless communication device.

18. A computer program product for recovering from a transmission channel change during a streaming media session over a wireless network, the computer program product comprising at least one non-transitory computer readable storage medium having computer program code stored thereon, the computer program code comprising program code configured to cause a wireless communication device to:

detect a stall condition in data transmission for the streaming media session, the detected stall condition resulting from a transmission channel change;

capture a snapshot of a transmission parameter state of the streaming media session in response to detecting the stall condition; and use the snapshot to restore the streaming media session to the transmission parameter state captured by the snapshot following completion of the transmission channel change.

19. The computer program product of claim 18, wherein the computer program code further comprises program code configured to cause the wireless communication device to:

determine whether the stall condition resulted from a transmission channel change;

use the snapshot to restore the streaming media session to the transmission parameter state captured by the snapshot only in an instance in which it is determined that the stall condition resulted from a transmission channel change; and in an instance in which it is determined that the stall condition did not result from a transmission channel change, initiate a slow ramp up of a data transmission rate of the streaming media session to recover from the stall condition.

20. The computer program product of claim 19, wherein the computer program code further comprises program code configured to cause the wireless communication device to determine whether the stall condition resulted from a transmission channel change at least in part by causing the wireless communication device to:

wait for up to a defined period of time for an indication from a baseband layer that a transmission channel change has occurred;

determine that the stall condition resulted from a transmission channel change in an instance in which an indication that a transmission channel change has occurred is provided by the baseband layer within the defined period of time; and determine that the stall condition did not result from a transmission channel change in an instance in which an indication that a transmission channel change has occurred is not provided by the baseband layer within the defined period of time.

* * * * *